United States Patent
Okubo et al.

(10) Patent No.: US 8,140,204 B2
(45) Date of Patent: Mar. 20, 2012

(54) CHARGE DEPLETING ENERGY MANAGEMENT STRATEGY FOR PLUG-IN HYBRID ELECTRIC VEHICLES

(75) Inventors: Shunsuke Okubo, Belleville, MI (US); Ming Lang Kuang, Canton, MI (US); David Richens Brigham, Ann Arbor, MI (US); Michael Alan Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 1086 days.

(21) Appl. No.: 11/953,267

(22) Filed: Dec. 10, 2007

(65) Prior Publication Data

US 2009/0150015 A1     Jun. 11, 2009

(51) Int. Cl.
*B60W 20/00* (2006.01)
(52) U.S. Cl. .......................................... 701/22; 903/930
(58) Field of Classification Search .................... 701/22; 180/65.1, 65.2, 65.3, 65.4, 65.29, 65.265
See application file for complete search history.

(56) References Cited

U.S. PATENT DOCUMENTS

| | | | |
|---|---|---|---|
| 6,116,363 A | 9/2000 | Frank | |
| 6,362,602 B1 | 3/2002 | Kozarekar | |
| 7,013,205 B1 | 3/2006 | Hafner et al. | |
| 7,021,409 B2 | 4/2006 | Tamor | |
| 7,100,362 B2 * | 9/2006 | McGee et al. | 60/284 |
| 7,360,615 B2 * | 4/2008 | Salman et al. | 180/65.265 |
| 7,398,845 B2 * | 7/2008 | Kuang et al. | 180/65.265 |
| 7,407,026 B2 * | 8/2008 | Tamor | 180/65.28 |
| 2004/0230376 A1 * | 11/2004 | Ichikawa et al. | 702/2 |
| 2006/0021803 A1 * | 2/2006 | Iiduka et al. | 177/180 |
| 2007/0029121 A1 * | 2/2007 | Saitou et al. | 180/65.2 |
| 2008/0125265 A1 * | 5/2008 | Conlon et al. | 475/5 |
| 2009/0107743 A1 * | 4/2009 | Alston et al. | 180/65.21 |

* cited by examiner

*Primary Examiner* — Thomas Black
*Assistant Examiner* — Marthe Marc-Coleman
(74) *Attorney, Agent, or Firm* — David Kelley; Brooks Kushman P.C.

(57) ABSTRACT

A method for managing power distribution from an engine and a battery in a plug-in hybrid electric vehicle whereby battery power is used to meet a driver demand for power and engine power complements battery power when either battery state-of-charge limit or battery discharge power limit would be exceeded, an external power grid being used to restore battery power following battery charge depletion.

18 Claims, 3 Drawing Sheets

CHARGE DEPLETING ENERGY MANAGEMENT STRATEGY FOR PLUG-IN HYBRID ELECTRIC VEHICLES

BACKGROUND OF THE INVENTION

1. Field of the Invention

The invention relates to hybrid electric vehicles having a traction motor, an internal combustion engine and a traction battery that can be charged using an external electrical grid.

2. State of the Art Discussion

A known hybrid electric vehicle powertrain may have an internal combustion engine, an engine-driven generator and an electric motor wherein the energy source for the engine is a hydrocarbon-based fuel and the energy source for the electric motor is a high voltage battery and generator sub-system. The battery may be charged by the engine using fuel stored in the vehicle or from an external electric grid. In the case of a hybrid electric vehicle in which the battery is charged from an external electrical grid, an all-electric vehicle drive range is possible while the engine is off, thereby avoiding production of undesirable engine exhaust gas emissions. This feature is of particular importance for vehicles operating in an urban environment. Such vehicles, which sometimes are referred to as "plug-in" hybrid electric vehicles, are capable also of achieving improved overall fuel economy compared to the fuel economy of comparable non-hybrid vehicles.

If the range of a given vehicle driving event is limited, such vehicles can be operated with the engine off altogether. The battery, which may be depleted a moderate amount to a state-of-charge state less than a calibrated maximum charge but greater than a minimum state-of-charge, can be recharged using the electrical grid during driving off-time.

There are three general classifications for hybrid electric vehicle powertrains; i.e., series hybrid electric powertrains, parallel hybrid electric powertrains and series-parallel hybrid electric powertrains, the latter including so-called power-split hybrid electric powertrain systems. In the case of a series hybrid electric vehicle powertrain, an internal combustion engine drives a generator, which converts mechanical engine power to electrical power. A portion of the electrical power is used to drive an electric motor, which converts electrical power back to mechanical power to drive vehicle traction wheels. The power not needed by the motor is used to charge a battery.

In the case of series-parallel and parallel gasoline-electric hybrid vehicles, mechanical engine power can be delivered to the traction wheels, and electric power can be delivered from a battery to a motor, which converts the electric power to mechanical power to drive the traction wheels. Power flow from the engine to the generator will occur when the battery is being charged. Transmission gearing forms parallel power flow paths to vehicle traction wheels.

A common misconception about series-parallel and parallel hybrid electric vehicle powertrains is that vehicle propulsion using only electric power improves overall fuel economy because the vehicle uses no hydrocarbon fuel when the engine is off. However, this is not the case because losses incurred by the electric motor and the battery during discharging and subsequent battery charging will degrade overall engine fuel economy as electric power is converted to mechanical power and mechanical power is converted to electric power. Therefore, in known parallel and series-parallel hybrid electric vehicle powertrains that use a hydrocarbon-based engine and an electric motor powered by a battery, the guiding design principle for energy management software strategy is to provide as much propulsion as possible with an internal combustion engine, while selectively using the electrical system to increase average overall operating efficiency of the engine. An example of selective engine use includes engine-off electric driving during low driver demand situations, or slight battery discharging or charging to adjust engine power to achieve maximum engine thermal efficiency.

A parallel or series-parallel hybrid electric vehicle powertrain that relies upon an external powertrain grid for charging the traction battery (i.e., a plug-in vehicle) can achieve the best fuel economy using electric-only propulsion because there is an external energy source available rather than gasoline stored in the vehicle. A new energy management software strategy, therefore, is required to realize the fuel economy improvements that can be gained using a plug-in series-parallel or parallel hybrid electric vehicle powertrain.

SUMMARY OF AN EMBODIMENT OF THE INVENTION

An embodiment of the invention comprises a so-called "charge depletion" energy management strategy to maximize the use of the electrical energy stored in the battery without compromising engine efficiency. The engine will be turned off by default using the strategy of the invention so that the engine is used only in certain operating conditions. For example, the engine is prevented from starting when vehicle operation begins with a so-called "silent start" feature using electric power only. If pre-determined operating conditions do not exist (e.g., high vehicle acceleration), the engine may be kept off throughout the entire driving cycle as the vehicle operates in an electric mode only.

If the battery alone cannot provide sufficient energy to meet a driver demand for power, the engine can be turned on. For example, if the battery discharge power limit is exceeded, or if the battery operating temperature is too high, the engine can be started to supplement battery power to meet driver demand.

If the driver demand would require a motor speed that would exceed predetermined limits of motor driven components, the engine may be turned on to protect the powertrain components connected to the engine, as well as the motor and motor driven components. If the engine is required to operate together with the motor, the strategy of the invention will establish a minimum engine power that will achieve reasonable engine efficiency.

The engine will not be allowed by the strategy to operate at a power less than a predetermined minimum lest the engine efficiency would be significantly degraded. The thermal efficiency of the engine can be allowed to decrease to a predetermined minimum, however, as the engine is operating at a power value at least as high as the calibrated minimum engine power value, although overall fuel economy may be somewhat degraded, in order to meet a driver demand for power.

BRIEF DESCRIPTION OF THE DRAWINGS

FIG. 3 is a plot of the relationship of engine power to thermal efficiency for an internal combustion engine used in the powertrain of FIGS. 1 and 1a;

PARTICULAR DESCRIPTION OF AN EMBODIMENT OF THE INVENTION

Figure 1:
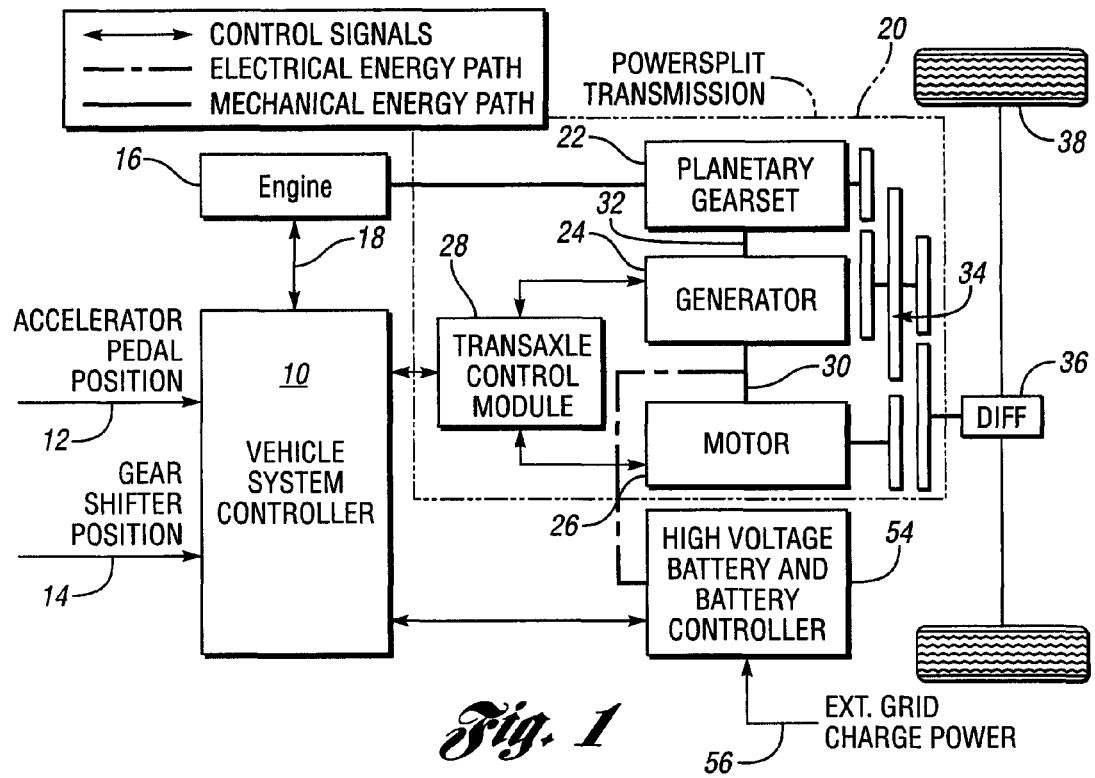
FIG. 1 is a schematic block diagram of a power-split parallel hybrid electric vehicle powertrain capable of using the strategy of the present invention.
Figure 1A:
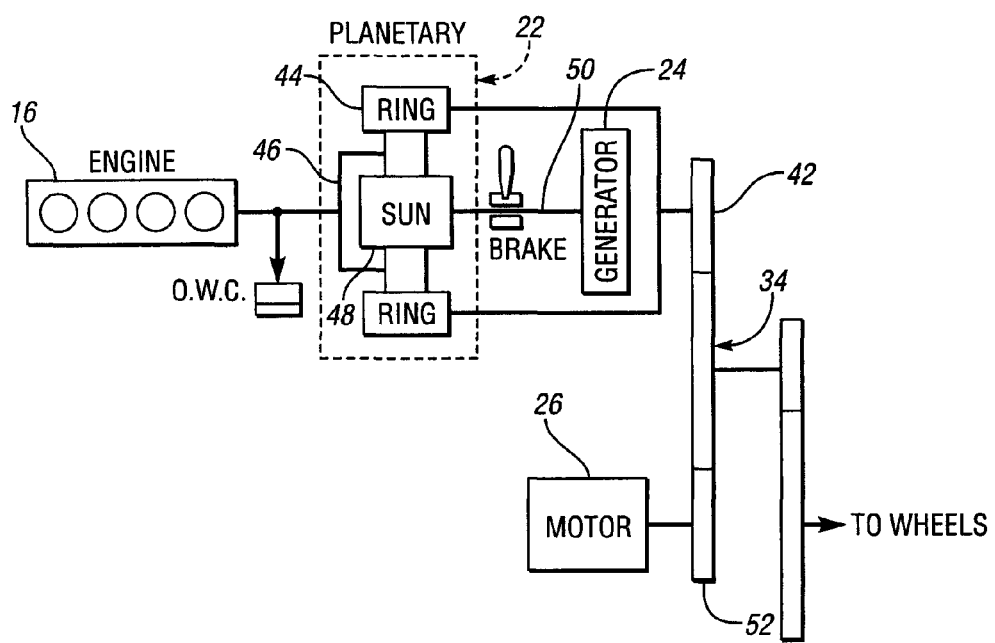
FIG. 1a is a schematic view of hardware for a power-split hybrid electric vehicle powertrain of the type generally indicated in the block diagram of FIG. 1.

The powertrain configuration of FIGS. 1 and 1a is a power-split hybrid electric vehicle powertrain, which is one example in a class of powertrains for hybrid electric vehicles known as parallel hybrid electric vehicles. Although the parallel power-split hybrid powertrain of FIGS. 1 and 1a will be particularly described, the strategy of the invention can apply also to other hybrid configurations. For example, it can be applied to a hybrid powertrain with a single motor/generator.

In FIG. 1, a vehicle system controller 10 receives vehicle driver input signals, including accelerator pedal position signal 12 and a gear selection signal 14. An internal combustion engine 16 delivers engine speed and engine torque signals to the vehicle system controller, as shown at 18. The engine delivers power to a power-split transmission 20, which includes a planetary gearset 22, an electric generator 24 and an electric motor 26. The electric generator and the electric traction motor sometimes are called electric machines since each may operate as either a motor or a generator.

The generator and motor are under the control of a transmission (transaxle) control module 28. The generator is drivably connected to the motor, as shown at 30, and a power output element of the planetary gearset drives the generator through a mechanical connection shown at 32. Power transfer gearing 34 drivably connects the planetary gearset power output element and the motor to a differential-and-axle assembly 36 for driving traction wheels 38.

The planetary gearset 22 of the transmission 20 is more particularly illustrated in the schematic drawing of FIG. 1a. It includes a ring gear 40 connected drivably to gear element 42 of gearing 34. The engine 16 is directly connected to carrier 44, which meshes with ring gear 44 and sun gear 48. Generator 24, which is drivably coupled to sun gear 48, and is under the control of transaxle control module 28, regulates engine speed as generator load changes. Electric traction motor 26 is drivably connected to gear element 52 of the gearing 34.

A battery and battery controller 54 is electrically coupled to generator 24 and motor 26. When the state-of-charge of the battery at 54 nears depletion, it can be charged using external grid charge power as shown at 56.

Both the engine and the electric motor deliver power to the traction wheels. Reference may be made to U.S. Pat. No. 6,994,360 for a description of a power delivery path from the two power sources to the wheels. This patent is assigned to the assignee of the present invention.

Both the engine and the electric motor deliver power to the driveline in the power split hybrid system of FIGS. 1 and 1a. The vehicle system controller 10 coordinates power delivery from the two power sources to achieve the best fuel economy, better quality emissions, better performance and improved drivability. The vehicle system controller 10 issues engine torque commands to the engine controller and engine speed commands and wheel torque commands to the transmission control module 28.

The vehicle system controller does not issue battery power commands to the battery subsystem. Rather, a target battery power is achieved by creating a difference between the driver demanded power and the engine power available. If the driver demanded power is larger than the power available at the engine, the battery will be discharged. If the driver demanded power is less than the available engine power, the battery will be charged. The charge depletion energy management strategy of the invention uses the powertrain elements to charge and discharge the battery.

The energy management strategy of the invention will maximize the use of the electrical energy in the battery without compromising engine efficiency. This is accomplished by turning the engine off by default so that the engine can be commanded to turn on only if certain operating conditions exist. If those conditions do not exist, the engine will be kept off.

The first time the engine is turned on for any reason in a given drive cycle (e.g., to charge the battery), a cold start warm-up routine is executed to condition the engine for the best exhaust gas emission quality. If the criteria to turn the engine on are not met during a drive cycle, as described subsequently, the vehicle may operate in an electric mode only.

If the battery alone cannot provide the power required to meet a driver demand for power, the engine is turned on. If the driver demand exceeds a threshold, which is defined in part by a high voltage battery discharge power limit, by battery state-of-charge and by battery temperature, then the engine is started to meet the driver's demand. If any of these parameters falls below a defined threshold, including a hysteris value to prevent rapid cycling from one state (on or off) to the other, then the engine is turned off. These thresholds can be constant or they can be determined in real-time, based on any available software variable, by the charge depletion energy management strategy of the invention.

Figure 3:
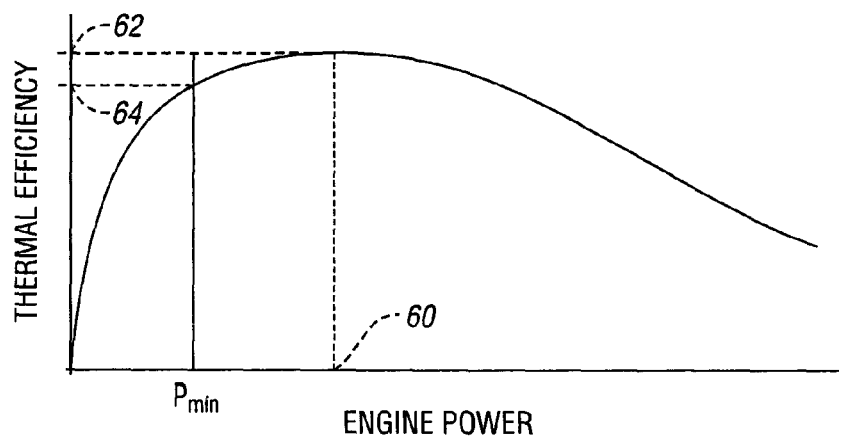

If the strategy requires a reduction in power to a value $P_{min}$, a relatively minor decrease in thermal efficiency occurs, as shown by points 62 and 64 in FIG. 3.

Figure 4:
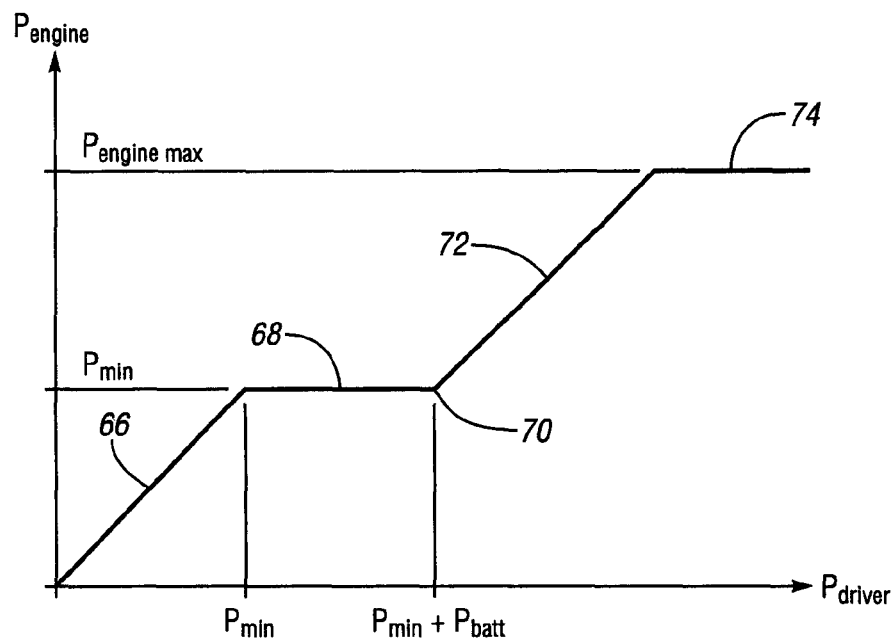
FIG. 4 is a plot of engine power and driver demand for power for a hybrid electric vehicle powertrain when the engine is required to be on for reasons other than for the delivery of power to the vehicle traction wheels.

If the engine must be turned on regardless of driver demand, FIG. 4 shows the relationship between driver demanded power $P_{driver}$, the target engine power $P_{engine}$ and the electric power usage $P_{batt}$. $P_{batt}$ depends upon the high voltage discharge limit, the battery SOC, battery temperature and other hardware constraints. It may be calculated in real-time, or it may be a value selected by the driver. It may be the smaller of a calibratable parameter and the high voltage battery discharge power limit. When the driver demanded power $P_{driver}$ is less than $P_{min}$, $P_{engine}$ is set equal to $P_{driver}$. This is represented by the linear relationship in FIG. 4 shown at 66. When the driver demanded power $P_{driver}$ is more than $P_{min}$, but is less than $P_{min}+P_{batt}$, the engine power $P_{engine}$ will remain at $P_{min}$, as shown in FIG. 4 by the horizontal plot 68. It is this relationship between $P_{engine}$ and $P_{driver}$ that enables the charge depletion strategy of the invention to maximize battery usage without degrading engine efficiency appreciably.

When driver demanded power $P_{driver}$ exceeds the sum of $P_{min}$ and $P_{batt}$, as shown at 70 in FIG. 4, engine power $P_{engine}$ is increased linearly with respect to $P_{driver}$. This is shown at 72 in FIG. 4. This relationship ensures delivery of the driver's requested power. The maximum engine power is represented at 74.

The plot of FIG. 4 shows that the engine may be required to operate, as shown by the linear relationship 66, when the powertrain system and other vehicle systems require the engine to be operating for reasons not related to the charge depletion strategy (e.g., the need for accessory power, etc.). The engine needs to be on only if the battery is so depleted that it cannot supply sufficient power to electrically-driven accessories or if the engine drives the accessories directly. The engine must be on also in other situations, including a cold start mode, or an active component protection mode.

Figure 5:
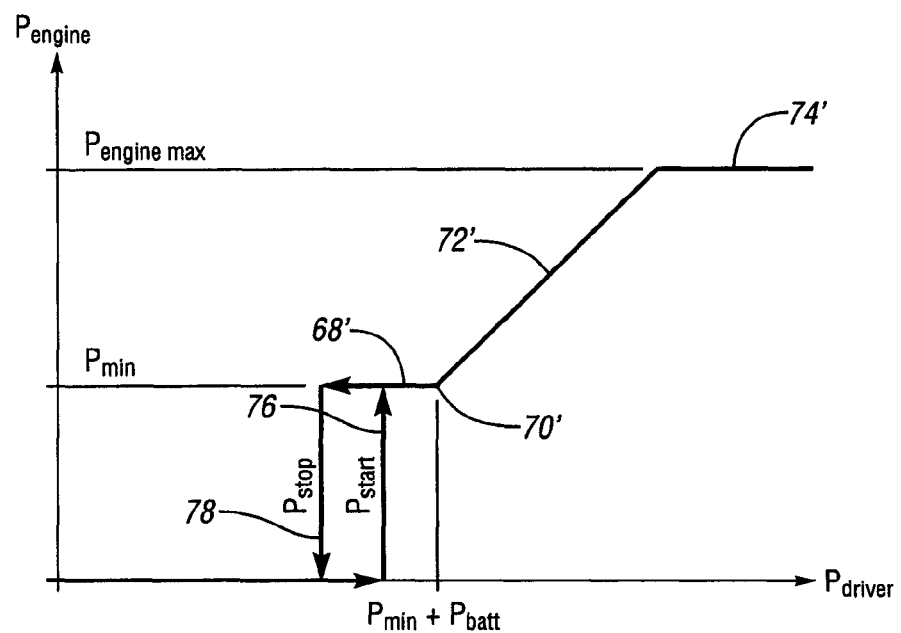
FIG. 5 is a plot of engine power and driver demand for power under driving conditions in which engine power is not required at low values of driver demand for power.

When the engine state (i.e., engine on or engine off) is not constrained by hardware thresholds, the relationship between $P_{driver}$ and $P_{engine}$ is somewhat different than the relationship illustrated in FIG. 4. This is illustrated in FIG. 5. In FIG. 5, the plot is similar to the plot of FIG. 4 at values of driver demanded power greater than the minimum power $P_{min}$, but it is different at values of driver demanded power less than $P_{min}$.

FIG. 5 shows engine on and off thresholds for driver demand. The threshold for engine start is indicated at 76 and the threshold for engine stop is shown at 78. The portions of the plot of FIG. 5 that are similar to the plot of FIG. 4 have been illustrated by the same reference characters, although prime notations are added. Again, the charge depletion energy management strategy maximizes the battery usage without degrading engine efficiency by operating the engine at $P_{min}$ when the driver demanded power $P_{driver}$ is between $P_{min}$ and $P_{min}+P_{batt}$. The separation (hysteresis) between the point at which the engine is started ($P_{start}$) and the point at which the engine is stopped ($P_{stop}$) prevents unwanted cycling between "on" and "off" states. When the engine is started at the threshold at 76, the engine operates at minimum power, as shown at 68. At that instant, battery power is reduced so that the sum of engine power and battery power will satisfy driver demand for power.

Figure 2:
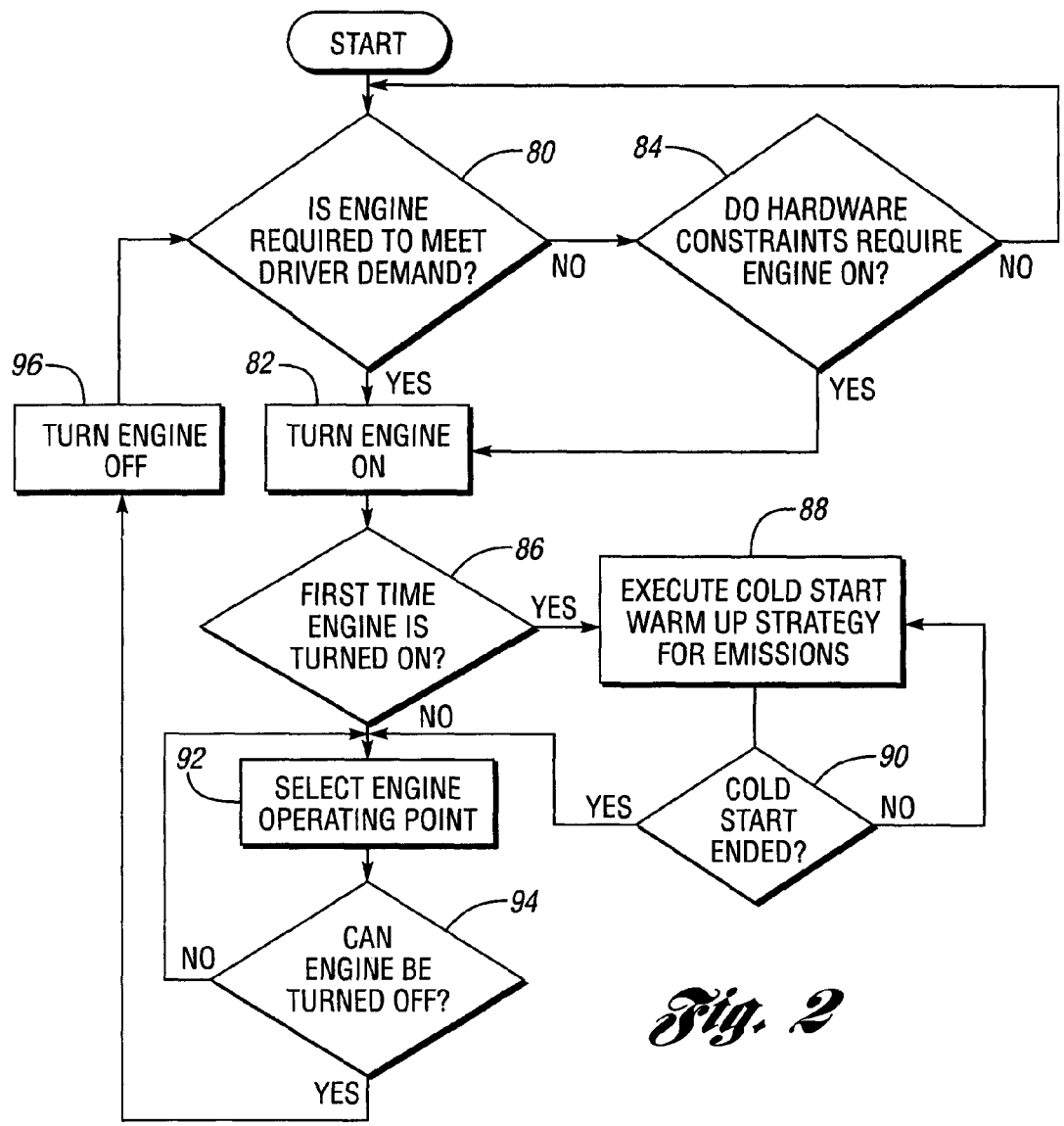
FIG. 2 is a flowchart that illustrates the energy depletion strategy of the present invention.

The charge depletion strategy of the invention is illustrated in the software flowchart of FIG. 2. In FIG. 2, the strategy begins by inquiring whether the engine is required to meet a driver demand, as shown at 80. If the engine is required to be on, the engine is turned on as shown at action block 82. If engine power is not required, the hardware constraints previously described are tested at 84. If the hardware constraints do not require the engine to be turned on, the engine is kept off.

If hardware constraints require the engine to be on, the engine is turned on, as shown at 82. It then is determined whether the engine is being turned on for the first time in a drive cycle, as shown at 86. If the engine is being turned for the first time, an engine cold start warm-up strategy is carried out, as shown at action block 88. This ensures that exhaust gas emission quality standards are met. If they are met, as indicated by the decision block 90, the routine may proceed, as shown at 92, and an engine power operating point is selected. If the cold start warm-up strategy has not ended, the engine will be kept on until the cold start mode has ended.

The engine power operating point that is selected at 92 will be a value corresponding to a thermal efficiency between the maximum thermal efficiency point 62 corresponding to engine power 60, and the reduced thermal efficiency point 64 corresponding to $P_{min}$. When the powertrain reaches a condition that will permit the engine to be turned off, a decision is made at 94 to turn the engine off, as shown at 96. Otherwise, the routine will return to action block 92.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. An energy management method for a plug-in hybrid electric vehicle powertrain having an engine, at least one electric machine, a battery, and a power transmission mechanism for delivering engine power and battery power to vehicle traction wheels, the method comprising:
   monitoring battery state-of-charge;
   controlling the battery state-of-charge whereby battery power discharge is below a power discharge limit;
   monitoring driver demand for power at the vehicle traction wheels;
   maintaining the engine in an engine-off state to achieve an all-electric drive when battery state-of-charge is greater than a predetermined battery charge threshold and driver demand for power is less than a minimum calibrated engine power threshold level for an engine start below which engine thermal efficiency becomes low;
   controlling the engine to turn the engine on when the driver demand for power is equal to or greater than the minimum calibrated engine power threshold level; and
   increasing engine power when a driver demand for power is greater than a sum of minimum engine power and the power discharge limit whereby the engine operates at an engine power level greater than the minimum engine power.

2. The method set forth in claim 1 wherein controlling the battery includes increasing battery power to meet driver demand for power when the monitored battery state-of-charge is greater than a minimum predetermined level.

3. The method set forth in claim 2 wherein controlling the battery includes charging the battery from an external electric power source when the vehicle is inactive to restore battery state-of-charge.

4. The method set forth in claim 1 wherein controlling the engine comprises turning the engine on in advance of an increase in driver demand for power at the vehicle traction wheels in excess of the minimum engine power, and turning the engine off when the driver demand for power at the vehicle traction wheels decreases to a value less than the driver demand for power at the traction wheels at which the engine is turned on whereby cycling of the engine between on and off states is avoided.

5. The method set forth in claim 4 wherein controlling the battery includes charging the battery from an external electric power source when the vehicle is inactive to restore battery state-of-charge.

6. The method set forth in claim 1 wherein controlling the battery includes charging the battery from an external electric power source when the vehicle is inactive to restore battery state-of-charge.

7. The method set forth in claim 1 wherein controlling the battery includes turning the engine on if powertrain hardware constraints are exceeded when the vehicle is operating in an electric-only operating mode.

8. An energy management method for a plug-in hybrid electric vehicle powertrain having an engine, at least one electric machine, a battery, and a power transmission mechanism for delivering engine power and battery power to vehicle traction wheels, the method comprising:
   monitoring driver demand for power;
   controlling battery state-of-charge below a battery power discharge limit;
   maintaining the engine in an engine-on state when a driver demand for power is less than a minimum engine power required to meet driver demand for power and powertrain hardware constraints require the engine to be on;
   controlling the battery to meet a driver demand for power when the driver demand for power is in excess of a minimum engine power below which engine thermal efficiency becomes low and the driver demand for power is less than the sum of minimum engine power and a given battery power discharge level; and increasing engine power when a driver demand for power is greater than a sum of battery discharge power limit and minimum engine power whereby the engine operates at an engine power level greater than the minimum power level.

9. The method set forth in claim 8 wherein controlling the battery includes increasing battery power to meet driver demand for power when the monitored battery state-of-charge is greater than a minimum predetermined level.

10. The method set forth in claim 9 wherein controlling the battery includes charging the battery from an external electric power source when the vehicle is inactive to restore battery state-of-charge.

11. The method set forth in claim 8 wherein controlling the battery includes charging the battery from an external electric power source when the vehicle is inactive to restore battery state-of-charge.

12. The method set forth in claim 8 wherein controlling the battery includes turning the engine on if powertrain hardware constraints are exceeded when the vehicle is operating in an electric-only operating mode.

13. A method for a plug-in hybrid vehicle having an engine and battery, comprising:

maintaining an engine-off state to provide all-electric drive when battery state-of-charge exceeds a first threshold and driver demand is less than a second threshold associated with engine thermal efficiency;

operating the engine when the driver demand exceeds the second threshold; and increasing engine power when the driver demand exceeds a sum of a minimum engine power and a battery discharge limit.

14. The method of claim 13 further comprising:
operating the engine in response to powertrain hardware constraints.

15. The method of claim 13 wherein the powertrain hardware constraints include operation of at least one engine-driven accessory.

16. A hybrid vehicle management system comprising:
an engine;
a battery; and
a controller communicating with the engine and the battery to maintain an engine-off state when battery state-of-charge exceeds a first threshold and driver demand is less than an engine thermal efficiency threshold, operate the engine when the driver demand exceeds the efficiency threshold, and increase engine power when the driver demand exceeds a sum of a minimum engine power and a battery discharge limit.

17. The system of claim 16 wherein the controller operates the engine regardless of driver demand.

18. The system of claim 16 wherein the controller maintains an engine-on mode to operate at least one engine driven accessory regardless of the driver demand.

* * * * *